United States Patent
Sitko

(10) Patent No.: US 7,383,918 B1
(45) Date of Patent: Jun. 10, 2008

(54) NOISE SUPPRESSOR EXHAUST SOUND ATTENUATION OVERHAUL AND REPAIR KIT

(75) Inventor: James Sitko, Sealy, TX (US)

(73) Assignee: Vitai Link, Inc., Sealy, TX (US)

( * ) Notice: Subject to any disclaimer, the term of this patent is extended or adjusted under 35 U.S.C. 154(b) by 281 days.

(21) Appl. No.: 11/030,669

(22) Filed: Dec. 31, 2004

Related U.S. Application Data

(60) Provisional application No. 60/533,926, filed on Dec. 31, 2003.

(51) Int. Cl.
*B64F 3/00* (2006.01)
*B64F 1/26* (2006.01)

(52) U.S. Cl. .................. 181/218; 181/210; 181/211; 181/217

(58) Field of Classification Search .......... 181/210, 181/211, 217, 218
See application file for complete search history.

(56) References Cited

U.S. PATENT DOCUMENTS

| | | | | |
|---|---|---|---|---|
| 2,826,382 | A * | 3/1958 | Hayden | 181/210 |
| 2,942,682 | A * | 6/1960 | Bergh et al. | 181/218 |
| 3,011,584 | A * | 12/1961 | Lemmerman et al. | 181/217 |
| 3,187,835 | A * | 6/1965 | Smith | 181/217 |
| 3,196,977 | A * | 7/1965 | Sanders | 181/256 |
| 3,349,868 | A * | 10/1967 | Gunter | 181/217 |
| 3,630,313 | A * | 12/1971 | Smith | 181/218 |
| 3,684,054 | A * | 8/1972 | Lemmerman | 181/203 |
| 3,688,865 | A * | 9/1972 | Smith et al. | 181/218 |
| 3,710,617 | A * | 1/1973 | Andersen | 73/116 |
| 3,839,846 | A * | 10/1974 | Teller | 95/212 |
| 3,842,941 | A * | 10/1974 | Gerber | 181/218 |
| 4,122,912 | A * | 10/1978 | Lepor | 181/218 |
| 4,372,110 | A * | 2/1983 | Fletcher et al. | 60/262 |
| 4,747,467 | A * | 5/1988 | Lyon et al. | 181/218 |
| 4,835,961 | A * | 6/1989 | Presz et al. | 60/264 |
| 4,958,700 | A * | 9/1990 | Schafhaupt | 181/218 |
| 5,293,775 | A * | 3/1994 | Clark et al. | 73/116 |
| 5,377,534 | A * | 1/1995 | Boet | 73/116 |
| 5,715,672 | A * | 2/1998 | Schockemoehl et al. | 60/39.5 |
| 5,856,640 | A * | 1/1999 | Lynn | 181/218 |
| 6,056,084 | A * | 5/2000 | Schockemoehl et al. | 181/224 |
| 6,497,137 | B2 * | 12/2002 | Helgeson | 73/23.31 |
| 6,539,702 | B2 * | 4/2003 | Nishimura et al. | 60/39.5 |
| 6,851,514 | B2 * | 2/2005 | Han et al. | 181/224 |
| 2001/0029773 | A1 * | 10/2001 | Helgeson | 73/23.31 |
| 2005/0194205 | A1 * | 9/2005 | Guo | 181/210 |

* cited by examiner

*Primary Examiner*—Lincoln Donovan
*Assistant Examiner*—Jeremy Luks
(74) *Attorney, Agent, or Firm*—Harrison Law Office, P.C.

(57) ABSTRACT

Repairs and overhaul procedures are scheduled and implemented with a surprisingly low frequency. Repair and overhaul procedures are implemented wherein conventional noise suppression exhaust sound attenuation systems receive structural and functional enhancements for promoting longevity of efficient system operations. Degradation deficiencies of conventional configurations of sound attenuation systems for exhaust augmenters and deflector panels are avoided or prevented so that insulation re-packing rates may be minimized. Apparatus and associated methodology establish and implement maintenance protocols for installing specially-designed kits in existing sound attenuation systems. Proper installation inherently assures that maximum quantities of basalt-based insulation are reliably and efficiently packed into existing augmenters and deflector panels so that structural damage thereto under the inevitable influence of intense thermal heat transfers and vibratory loading may be reliably prevented or delayed until scheduled maintenance operations are scheduled. A plurality of synergies among acoustical components including acoustical pillows, acoustical blankets, batten plate assemblies, retaining wire mesh, and compressed basalt packing significantly reduce the frequency of prerequisite maintenance cycles.

15 Claims, 10 Drawing Sheets

NOISE SUPPRESSOR EXHAUST SOUND ATTENUATION OVERHAUL AND REPAIR KIT

RELATED APPLICATIONS

This application claims priority based upon Provisional U.S. Application Ser. No. 60/533,926 filed Dec. 31, 2003.

TECHNICAL FIELD

The present invention relates to maintenance for engine noise suppression exhaust sound attenuation systems, and more particularly relates to repair and overhaul procedures that are scheduled and implemented using specially-designed structural and functional enhancements to engine noise suppression exhaust sound attenuation systems for promoting longevity and efficiency thereof.

BACKGROUND OF THE INVENTION

Noise suppression apparatus and systems are vital in many fields, most notably in the development and ground testing of aircraft engines. The U.S. Air Force alone has noise suppression apparatus worth at least 250 million dollars and related real property worth at least 60 million dollars. Modern noise suppression apparatus—typically large and fixed—must regularly be maintained, upgraded, and overhauled in the field. Experience in the art has soundly demonstrated that improper or inadequate installation and/or insufficient maintenance of a noise suppressor and the like can cause significant damage to noise suppression systems, per se, and, of course, to implicated engines and aircraft. Indeed, improper or inadequate installation and/or insufficient maintenance of a noise suppressor can even cause permanent injury and loss of life.

Noise or sound suppression methodology has existed in the prior art for more than 20 years and commonly includes a sound augmenter cavity filled with a bottom layer of loose basalt covered by a basalt blanket. This basalt blanket is, in turn, wrapped with a wire mesh screen that encapsulates the insulation. This augmenter cavity is sealed with a stainless steel liner sheet and perforated to allow the transfer of sound and heat. It will be readily appreciated that, while such sound suppression technology has substantially remained stagnant, aircraft engines have continuously been improved, thereby concomitantly creating more noise. These developments in the art have adversely affected pre-existing noise suppression systems wherein modern aircraft engines not only have inherently stronger aerodynamics, but also engender intensified shock and thermal forces.

The common use of a fixed quantity of loose basalt often effects consequent settling thereof, which inevitably causes the sound augmenter and deflector cavities to be only partially filled therewith. Exhaust gases generated during engine operation create aerodynamic turbulence in the sound attenuation system, wherein engine thrust generates shock waves that are transferred to the noise suppressor structure. The high-temperature exhaust gases also transfer a large thermodynamic load to the sound suppression system. Since the prior art fails to densely pack augmenter cavities with basalt and simultaneously fails to stabilize the basalt, the prevalence of aerodynamic turbulence causes the tumbling of components therewithin. This, unfortunately, has been observed to cause basalt fibers to break down and to be inadvertently be expelled therefrom. This significant loss of insulation effects subsequent loss of thermal insulating capacity, loss of mass absorption capability against shock waves, and loss of acoustical attenuation capacity. This lowered noise suppression capability, in the face of aerodynamic and thermodynamic forces, causes these forces to be exerted on the sound suppression structure, per se, and thereby cause damage to or possibly even destroy expensive components. Indeed, such deficient noise suppression infrastructure tends to negate any sound attenuation capability thereof. It should be evident that such deficiencies and vulnerabilities of conventional noise suppression systems defeat its raison d'etre.

It will be appreciated that noise suppression systems known in the art must be maintained and repaired every one to five years, normally via replacement of lost or degraded insulating material, and concomitant repair of damaged structural components. It is also common knowledge among practitioners in the art that repetitive and frequent re-packing of sound augmenter and deflector insulation material tends to effectuate frequent facility down-times, to disrupt pre-planned facility activities, and consequently to increase costs attributable to necessary scheduling of frequent maintenance procedures. It will be readily appreciated that this crucial maintenance necessarily depends upon shipping of essential parts and materials.

It will also be understood that failing to rigorously maintain conventional noise suppression apparatus can cause sub-optimal sound attenuation which might cause personnel to suffer serious bodily injury, permanent disability, and even death. Improperly maintained components of a sound attenuation system contemplated hereunder are susceptible to damage from both aerodynamic and thermodynamic forces. Additionally, aircraft engines or aircraft, per se, in the process of being tested, can similarly be damaged or destroyed as a result of improper maintenance regimen which can, in turn, effect degradation and outright loss of insulation.

It is also known by those skilled in the art that basalt varies in density, form, and chemical composition. Indeed, it will be appreciated that not all basalt is suited to be used as insulating mineral wool or the like. The chemical composition of basalt fibers is directly related to insulation performance under various temperature conditions, applied forces, and metallic contact both within a noise attenuation apparatus and within the atmosphere at large. Basalt that has not been carefully selected based upon suitable prerequisite chemical composition may degrade readily under extreme conditions including high temperature, high pressure, and/or contact with systemic or atmospheric metals.

Field experience indicates that augmenters which have been in service for fewer than five years suffer from 85-90% depletion of insulation. This insulation depletion phenomenon has been observed to effect extensive internal structural damage associated with thermal heat transfers and vibratory loading that have been found to be attributable to inadequate insulation-packing. In particular, this damage can cause paint on interior surfaces to become abraded due to internal movement of fill materials and implicated wire screen during jet engine testing; it can also cause extensive wear to structural members at elongated slots, eventually leading to corrosion of metallic structural components. It is also known that inadequate installation also contributes to internal component damage.

For instance, interior compartment damage has been attributed to failure to secure floating bars, in situ, at structural slot locations, at improper stud weldments, and at broken welds affixed upon floating bar assemblies of structural slots. Bags of basalt insulation are commonly found to be installed in wrapping and matts, but not in wire screens. Furthermore, batten bars and other metallic materials have frequently been found to be inflicted with heavy corrosion.

Frequent demands that have been made and continue to be made—pertinent to re-packing of noise augmenters and deflectors—have been unable to keep abreast of apace developments of larger and more powerful jet engines and the like. It is not uncommon, unfortunately, to continue field operations of poorly maintained, sub-optimally performing augmenters and deflectors. Hence, it is a long-standing disability of the prior art that frequent failures persist because of a paucity of insight how to address the nature and scope of this noise-suppression problem. It should be evident that such insight is crucial in the context of hush house design, including not only manufacture and supply, but also, maintenance and repair thereof.

To avoid this downside of insulation loss, practitioners have adopted the methodology of frequently and repetitively re-packing augmenters and deflectors. Otherwise, it is well established that facilities will suffer unavoidable downtime which clearly has a detrimental impact upon jet engine efficiency and mission capabilities; increased costs attributable to engine shop work-arounds; the necessity for more shipments and deliveries of parts and the like due to frequent maintenance. Obviously, this frequent re-packing protocol drives life-cycle costs to unanticipated painfully-higher levels.

For instance, presently-known augmenter systems, as hereinbefore described, typically comprise a bottom layer of loose basalt blanketed by a single basalt layer which is, in turn, wrapped with a wire-mesh screening that is tucked around the basalt insulation layers. The top of the augmenter cavity is sealed by a stainless steel liner sheet that is perforated to enable both thermal and sound insulation. Packing the augmenter according to procedures known in the art requires a predetermined number of basalt bags—of particular weight and density—to be installed per augmenter cavity. As is known by those skilled in the art, this packing protocol only partially fills augmenter cavities.

It is well known that basalt rock varies by type that devolves from a certain chemical composition that determines its applicability for use as road base, rock or mineral wool, or for use in fiber manufacture. It should be noted that fiber properties including chemical composition has a substantial impact upon performance under exigent conditions typified by vibration, heat, and both metallic-contact and atmospheric-contact.

It is also known that exhaust gases generated during engine tests and the like create aerodynamic turbulence when a mixture of cooling air and engine exhaust exit through the engine exhaust system. As will be understood by those skilled in the art, engine thrust generates significant shock waves which are transferred to the noise suppressor foundation and related structures. These gases exit at high temperatures consequently transferring significant thermodynamic load to the exhaust system.

An inherent deficiency of this conventional exhaust system is that aerodynamic turbulence is transferred into the augmenter cavity. As hereinbefore described, this turbulence-transfer is due to the augmenter cavity not being thoroughly and tightly packed with basalt—with the basalt not being stabilized. It has been observed that turbulence causes the wire-mesh blanket and loose basalt to be dispersed throughout the augmenter cavity. It is also known that, making an adverse situation even worse, basalt fibers originally packed within this augmenter cavity are caused to break down by intense vibration and tumbling engendered during jet engine testing. It will be appreciated that these degraded basalt fibers are subsequently apt to be blown out of the augmenter cavity and deflector panels. Unfortunately, this degradation may be exacerbated by particular types of basalt fiber used which has been found to be inextricably intertwined with fiber-source, by temperature rating, and by fiber size (diameter and length).

In spite of these commonly used methods that strive to sustain exhaust system integrity, inherent basalt degradation unavoidably causes diminished thermal insulating capacity and diminished mass absorption capacity for coping with shock waves and effectuating acoustical attenuation. It will be understood by practitioners in the art that metal fatigue and system-component failure typically follow—possibly even to the extent of causing facility shutdown. Under these adverse circumstances, it will be readily appreciated that this plethora of conventional system deficiencies is functionally related to increased costs imposed by the criticality of performing frequent maintenance and repair of a plurality of augmenter internal metal components. Ironically, the loss of acoustical-attenuation capacity, in turn, degrades noise suppressor performance which undermines the very functional purpose of the exhaust system augmenter and associated noise suppression apparatus and procedures.

Field experience has demonstrated that augmenters which have been placed in service for less than five years have insulation situated within the augmenter cavity asymptotically approaching 85-90% depletion. This all-too-common scenario has been frequently documented with concomitant extensive internal structural damage associated with intense thermal heat transfers and vibratory loading. Of course, such internal structural damage may be attributable to inadequate packing. In particular, this damage has been identified to flow from paint-abrasion caused by internal movement of fill materials and wire screen that undermines the integrity of interior structural members during jet engine testing and the like. Internal structural damage has also been identified as flowing from extensive wear of structural members at elongated slots. Furthermore, damage to interior compartments has been attributed to failure at structural slot locations prerequisite for securing floating bars, in situ; to improper stud weldments; and to broken welds that were intended to be affixed to structural slots' floating bar assemblies used to secure the floating bars, per se. It will thus be appreciated that such interior compartment damage signals the onset of corrosion in view of the existence of inadequate protective coating, thereby leading to material deterioration and breakdown.

It has been found that other deficiencies tend to undermine effectiveness and efficiency of sound suppressor systems contemplated hereunder. One such deficiency is routinely including undetermined residual fill material functioning as augmenter packing. This, of course, impacts a plurality of augmenter components: the augmenter section located closest to the collector tube which is designed to protect the collector tube from thermal temperatures and thrust; stainless steel liner panels which are apt to corrode; support members welded to the liner panels which are also apt to corrode.

It should be evident that this corrosion is attributable to insulation loss and resultant exposure to higher temperatures. It has also been observed in the field that workmanship problems are not uncommon. For instance, basalt bags of insulation have been found to be installed in wrapping; and basalt matt and wire screen have been found to be missing outright. In addition, batten material has been found to be heavily corroded.

As will be clear to those conversant in the art that constant protracted exhaust systems failure known in the art is attributable to sound suppression systems lagging behind ongoing jet engine developments. That is, while conventional sound suppression and attenuation system was originally substantially designed in 1979 and was re-designed 1985, engine thrust level has changed significantly during a 1979-1985 time frame.

As should be evident to those skilled in the art, an upgrade program as hereinafter described has not heretofore been contemplated. Inherent in the art, has been and continues to be frequent demand for re-packing of augmenters and deflectors in the field. Moreover, it will also be appreciated that, not-uncommonly, in the art to continue field-operation of poorly-maintained, sub-optimally-performing augmenters and deflectors. Yet another long-standing disability of the prior art is failure of practitioners to have sufficient insight to properly address the nature and scope of this seemingly indigenous problem. Indeed, there appears to be an invisible wall between design, manufacture, and supply of hush houses and the like, on the one hand, and maintenance and repair thereof, on the other hand.

Heretofore, there does not exist an adequate apparatus and an associated systemic method for providing reliable and effective noise augmenter and deflector installation, upgrade, maintenance, and repair. The prior art has been unable to provide specially-selected, cost-effective materials and concomitant structures to assure functionality and longevity of such materials and implicated noise suppression system components. Accordingly, these limitations and disadvantages of the prior art are overcome with the present invention, and improved means and techniques are provided for enabling improved noise suppression apparatus and methodology.

BRIEF DESCRIPTION OF THE DRAWING FIGURES

SUMMARY OF INVENTION

Figure 1:
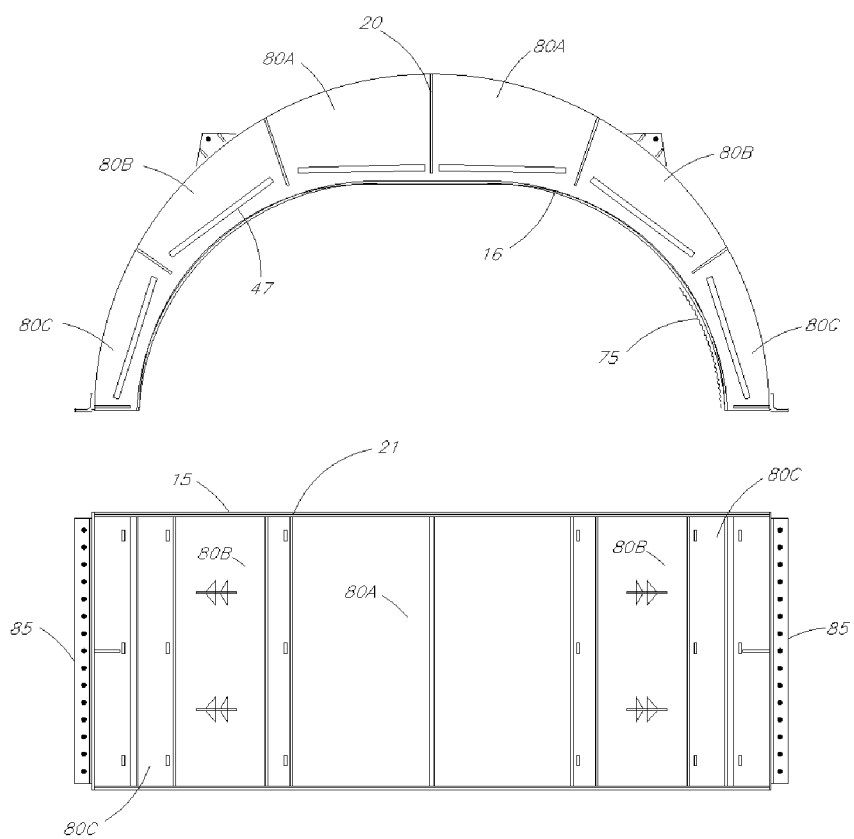
FIG. 1 depicts an embodiment of the augmenter maintenance aspect of the present invention, focusing on the upper section thereof.

The present invention enables repairs and overhaul procedures to be scheduled and implemented with a surprisingly low frequency heretofore unknown in the art. Repair and overhaul procedures are implemented in a straightforward manner wherein conventional noise suppression exhaust sound attenuation systems receive structural and functional enhancements for promoting longevity of efficient system operations. Embodiments address and improve upon deficiencies wherein conventional configurations of sound attenuation systems for exhaust augmenters and deflector panels tend to degrade at a rate which inherently requires frequent re-packing.

The present invention teaches an apparatus and associated methodology for establishing and routinely implementing maintenance protocols for installing specially-designed kits or the like in existing sound attenuation systems known in the art. Proper installation of embodiments of the present invention inherently assure that maximum quantities of basalt-based insulation are reliably and efficiently packed into existing augmenters and deflector panels so that structural damage thereto under the inevitable influence of intense thermal heat transfers and vibratory loading may be reliably prevented or delayed until scheduled maintenance operations are scheduled. It is a feature and advantage of embodiments of the present invention that a plurality of synergies among acoustical components including acoustical pillows, acoustical blankets, batten plate assemblies, retaining wire mesh, and compressed basalt packing significantly reduce the frequency of prerequisite maintenance cycles.

These and other objects and features of the present invention will become apparent from the following detailed description, wherein reference is made to the figures in the accompanying drawings.

DETAILED DESCRIPTION

Reference will now be made in detail to the present preferred embodiments of the invention, an example of which is illustrated in the accompanying drawings. Wherever possible, the same reference numbers will be used throughout the drawings to refer to the same or like parts.

In view of the well known deficiencies of conventional hush house exhaust and related technology, the present invention manifests significant development of noise suppression exhaust sound attenuation systems, wherein structural and functional enhancements thereto promote longevity of efficient operation. It will become clear that embodiments of the present invention enable repairs and overhaul procedures to be scheduled with a surprisingly low frequency and also enable such repairs and overhaul procedures to be implemented in a straightforward manner heretofore unknown in the art. Referred to herein as "ESAK" as an abbreviation for Exhaust Sound Attenuation Kit, the present invention features a system that simultaneously achieves an optimal technical solution to sound-attenuation that has heretofore eluded significant performance improvements with concomitant reasonable expenditure of man-time and cost.

Figure 8:
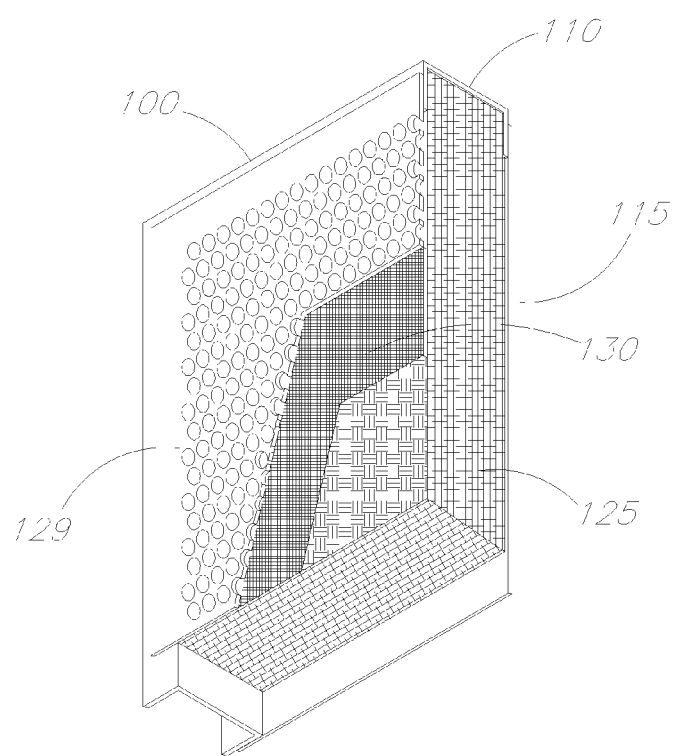
FIG. 8 depicts an embodiment of the deflector panel maintenance aspect of the present invention, depicting a frontal perspective view thereof.

The present invention builds upon the long-standing deficiency that configurations of sound attenuation systems known in the art for exhaust augmenters tend to degrade at a rate which inherently requires re-packing every two to five years as a function of test cycles and engine type. For instance, the U.S. Air Force has neither initiated nor established a program for re-designing the A/F32T-9 exhaust augmenter shown in FIG. 1 and the A/F37T-10 exhaust augmenter, similar to FIG. 1 (except without bolting flange 85), and the deflector, a panel of which is shown in FIG. 8, to extend service life cycle. As will become clear to those skilled in the art, embodiments configured according to teachings of the present invention are based upon concepts and technologies not included in current configurations. Notwithstanding, underlying fundamental materials incorporated into embodiments of the present invention have been proven in other demanding applications. Such materials have been applied to embodiments for substantially increasing performance life of exhaust systems through application of a synergistic combination of proven, specially-selected and relatively-inexpensive acoustic components.

Figure 10:
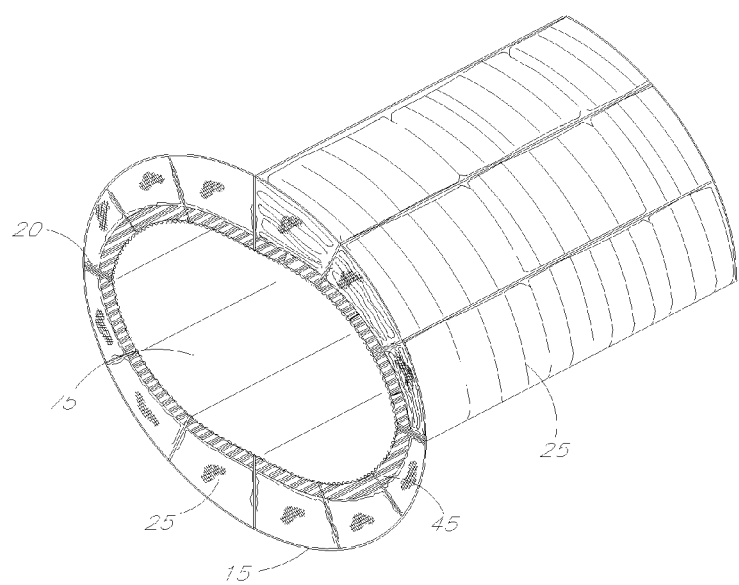
FIG. 10 depicts the embodiment of the augmenter bottom basalt installation depicted in FIG. 4, shown without the augmenter outer steel shell.

ESAK embodiments have been designed in kit-form to enable the objectives recited hereunder to be accomplished by proper installation of kits in the field or otherwise, via maintenance protocols contemplated as already being in situ. Thus, now referring to FIGS. 4 and 10, a layer of loose rolled basalt is installed at the bottom portion of an augmenter cavity. This basalt roll is encapsulated with an acoustical blanket 26. Next, a high-temperature acoustical pillow 45 is installed atop the acoustical blanket. Also referring to FIGS. 5 and 6, this pillow is then encapsulated with a stainless steel wire mesh screen 46 that is held in situ by a welded and bolted batten bar apparatus 47-51, inclusive. More particularly, as will be hereinafter described, this apparatus comprises flatbar batten plates 47, plain weave stainless steel mesh cloth, batten plates 48, oversized washers or the like 51, and locking nuts or the like 50.

As will be understood by those skilled in the art, a pair of new batten plates 47 is firmly welded, wherein each plate is welded at each end of the augmenter cavity. To impart corrosion-protection, the interior structures are cleaned and painted. Cavities are overfilled with new cotton-stitched basalt matt 25, thereby providing cavities inherently having uniform insulation density.

Figure 2:
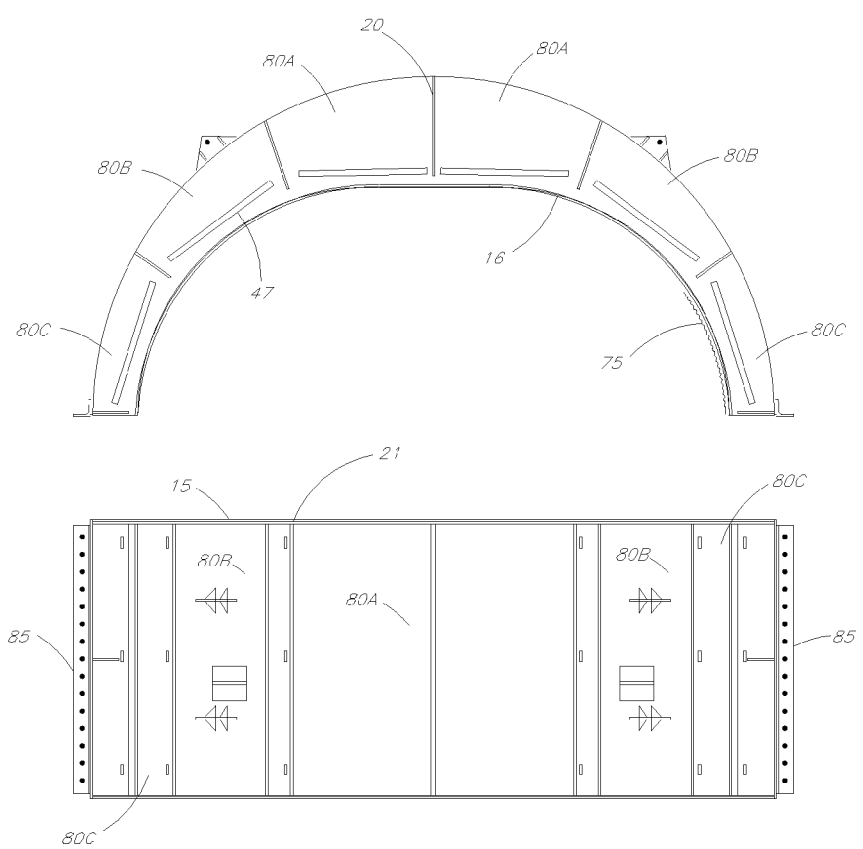
FIG. 2 depicts the embodiment of the augmenter maintenance aspect depicted in FIG. 1, focusing on the lower section thereof.
Figure 3:
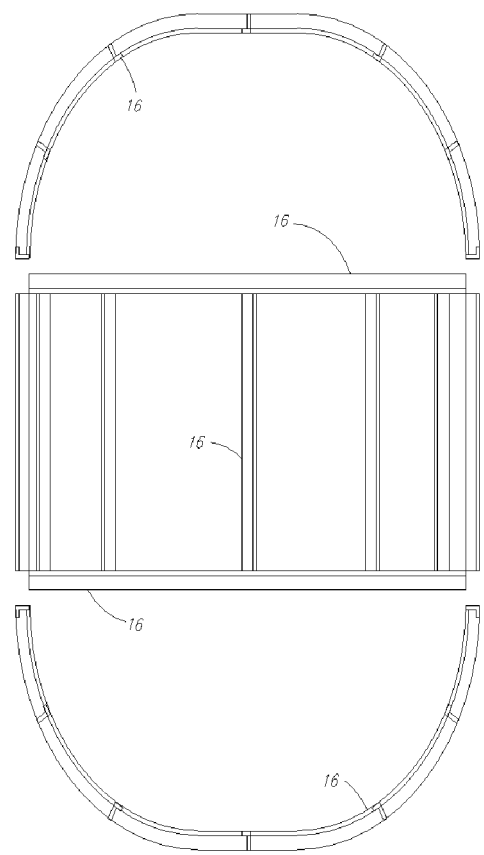
FIG. 3 depicts the embodiment of the augmenter maintenance aspect depicted in FIGS. 1 and 2, focusing on the stainless steel liner support section thereof.

For the installation of the present invention into an augmenter, as depicted in FIGS. 1 and 2, the augmenter is disassembled preferably using a suitably-sized crane or the like accompanied by onsite storage and lay-down accommodations for performing re-work operations. In particular, perforated liner sheets 75 should be removed and stored; preferably, bolt-in liner sheets should be used to replace old-style weld-in liner sheets. As will be understood by those conversant with the art, broken and/or damaged studs and concomitant attaching means such as fastening hardware should be repaired or replaced. As shown collectively in FIGS. 1-2 and 5, new batten plate assemblies comprising batten plate with welded-on studs 47 and 48, respectively, taught hereunder should then be welded in situ, thereby providing anchors for securing wire mesh screen thereto. The augmenter and its interior surfaces and implicated components should preferably be inspected for areas of corrosion; such areas should be cleaned and coated with suitable corrosion control means.

Figure 5:
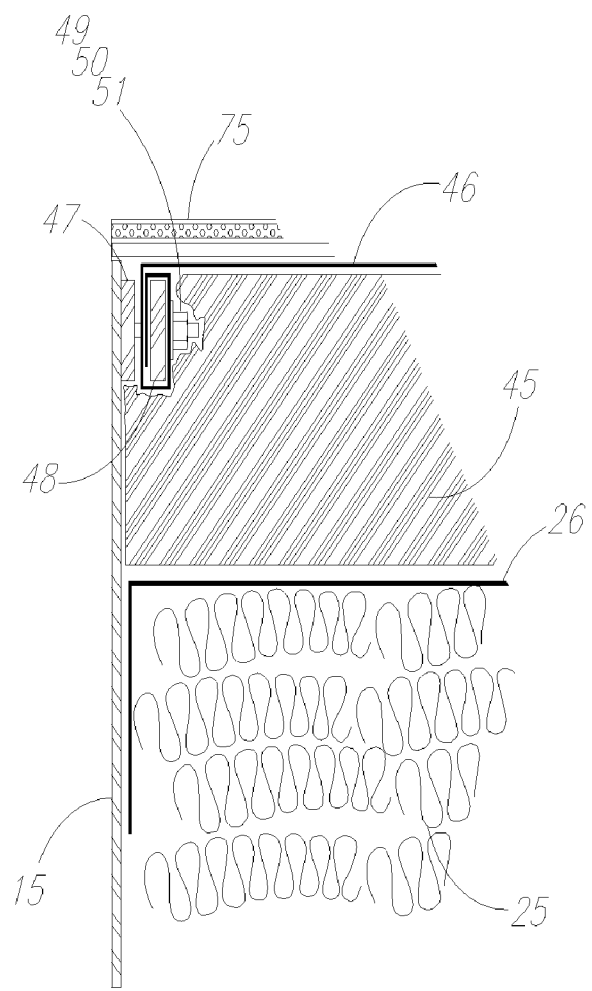
FIG. 5 depicts the embodiment of the augmenter maintenance aspect depicted in FIG. 4, depicting a cross-sectional view thereof along section "A-A."
Figure 6:
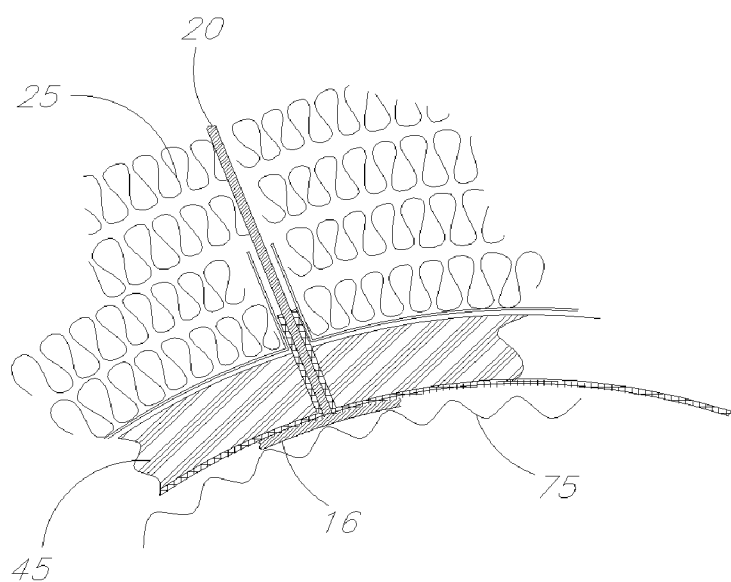
FIG. 6 depicts the embodiment of the augmenter maintenance aspect depicted in FIG. 4, depicting an enlarged view thereof at point "1."
Figure 7:
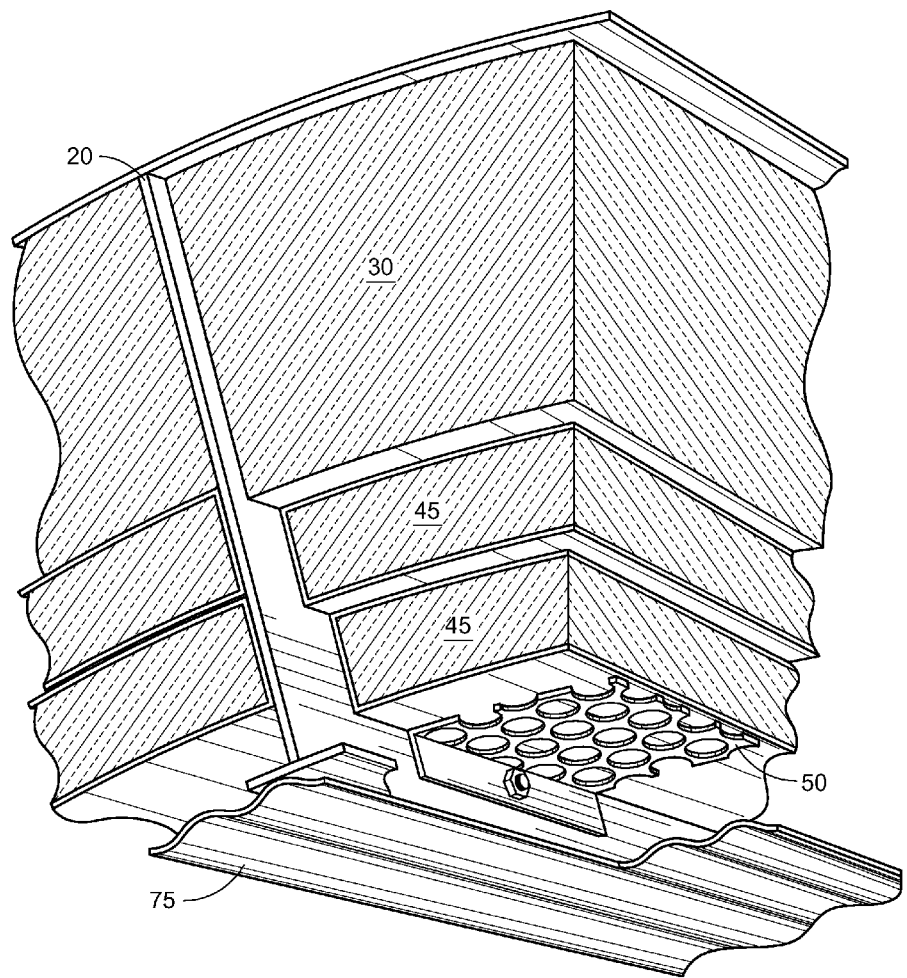
FIG. 7 depicts the embodiment of the augmenter maintenance aspect depicted in FIG. 4, depicting an enlarged, close-up perspective view thereof of typical insulation.

Still referring to FIG. 5, the loose rolled basalt 25 of the present invention should be installed in a uniform fashion to the prescribed quantity per augmenter cavity. The acoustical blanket 26 should preferably be installed over the augmenter cavity and then tucked around the loose basalt. The high-temperature acoustical pillow 45 is next installed over the acoustical blanket, and the sized wire mesh screen 46 is installed over the acoustical pillow. The augmenter compartment is compressed, with the wire mesh screen 46 being battened into place using a plurality of batten bars 49 and concomitant retaining hardware 50 and 51, respectively, well-known in the art.

Referring again to FIGS. 1-2, the insulation disposed between the augmenter 21 is then preferably replaced as appropriate to afford prerequisite acoustical sealing characteristics. Mevo-plate insulation has been found to afford suitable sealing properties. The augmenters are re-installed on the foundation as shown throughout FIGS. 1-7. It will be apparent to practitioners in the art that A/F32T-9 augmenters are preferably bolted together while A/F37T-10 augmenters are preferably welded together. Then, the exterior of the augmenter shell 15 should preferably be cleaned, prepared, and painted with high-temperature paint according to the base color scheme. To assure that sufficient adhesion and durability are obtained, the appropriate coating should be selected depending upon prior coating used and relevant performance history. Ergo, it should be evident that selection of a coating is limited by compatibility with the coating already in situ from previous coating-administrations. It should also be evident that, if a coating caused inadequate insulation and/or inadequate anti-corrosion performance in the past, then an alternative coating should preferably be selected.

When installing embodiments of the present invention, it has been found to be advantageous to fill augmenter cavities with basalt cotton-stitched matt 25, and then to preferably enclose this matt with a high-temperature acoustical grade blanket. Next, high-temperature pillows 45 are preferably installed followed by encapsulation by fine mesh stainless steel screen 46. Once the plurality of components comprising ESAK have been properly situated as taught hereunder, a dense and stable acoustical basalt fill heretofore unknown in the art is emplaced, thereby superseding pre-existing typically poor-performing, noise-attenuating components. That is, it has been found that ESAK significantly increases the amount of basalt insulation; the increased basalt mass and volume provides superior and efficient sound and thermal absorption affording longevity thereto heretofore unknown in the art.

In one embodiment of the present invention, basalt insulation is compressed to approximately 8 lbs/ft$^3$—unlike a density of 4 lbs/ft$^3$ heretofore commonly deemed to be acceptable by practitioner in the art. It has been learned that the surprising noise attenuation provided by ESAK and like embodiments of the present invention is at least partially attributable to compressing basalt insulation to a density of 8 lbs/ft$^3$ in order to emulate the natural density of basalt, wherein settling is effectively prevented once re-packing thereof has been accomplished. Ergo, the augmenter cavities 80A-C, per se, have been converted into a stable acoustical pillow assembly that reduces vibratory and shock loads imposed upon the basalt, thereby retarding breakdown and loss as hereinbefore described.

It will be appreciated that the mesh member 46 taught herein is preferably constructed from stainless steel wire mesh, preferably comprising tightly-woven, stiff large-diameter wire. As will be understood by those skilled in the art, these attributes enable the mesh member to function as a retention barrier for sustaining the location and effectiveness of basalt insulation; and also enables the mesh member to function as a wear pad for protecting the high-temperature pillow 45 or the like.

Thus, the present invention teaches a top basalt insulation barrier system that is fully enclosed by a stitched pillow 45 specially designed to accommodate high-temperature applications. It will be understood that this top insulation barrier has a configuration that inherently affords extraordinary basalt stabilization and concomitant protection and longevity. Contrariwise, it has heretofore been common in the art to use basalt loose-roll insulation in conjunction with matts. ESAK's thermal blanket member 26 permits sound transmission and absorption into the basalt loose-roll layer while simultaneously providing a basalt retention barrier. Hence, the present invention provides an assembly comprising a loose basalt roll 25 instead of the conventional loose basalt, thereby affording cotton-stitched, rolled insulation that, in turn, provides tighter interweaving of the underlying basalt fibers. This tightly woven structure inherently promotes both superior basalt stability and superior durability.

While embodiments of the present invention may be readily installed in the field, these and other embodiments may be installed in comparable new sound attenuation units. Indeed, it will be appreciated that ESAK is based upon proven materials—including basalt insulation 25, high-temperature acoustical pillows 45, and stainless steel wire mesh 46—adapted to be applicable to field-installation and to readily accommodate stringent operating environments such as the U.S. Air Force Noise Suppressor Program. It will be also be appreciated by those conversant in the art that ESAK's unique structure and functionality derive in part from adaptations of certain technologies that have been proven in European military test cells and the like.

Basalt embodiments contemplated hereunder include ingredients which have been manufactured by Lancaster Fibre Technologies ("LFT"). LFT basalt fibers have been observed to afford superior qualities such as lower rate of oxidation, fewer chemical impurities, longer fiber length, greater fiber diameter, and less insulation "shot" against fibers available from other basalt manufacturers. Commensurate with the performance demands of embodiments of the present invention, it has been found that LFT basalt enables contemplated high-temperature capabilities, while not only effectively retarding degradation of the implicated sound suppression structures, but also sustaining stability and longevity, integrity, and durability thereof.

It should be evident to those skilled in the art that the apparatus and methodology taught hereunder afford significant cost savings throughout the life cycle of an augmenter and the like. Of course, establishing a protocol such as the protocol integral to ESAK wherein (less frequent) maintenance cycles provide superior packing and related attributes for assuring optimal sound attenuation performance, routinely and reliably prolongs augmenter life cycle. It has been found that, when the teachings described herein are rigorously executed in proper sequence—including proper disassembly and refurbishment using preferred materials and concomitant re-pack procedures—ESAK integrity and performance typically enjoys a protracted life cycle of about 10 years rather than the commonly-observed minimal life cycle of 3 years. It will be appreciated by those conversant with the art that the actual duration of this lengthened life cycle depends upon the jet engine type and usage rate. It is also an aspect of the present invention that ESAK implementation costs increase approximately 45% more than conventional methodology; nevertheless, as herein elucidated, the benefits have exceeded expectations and, indeed, have been staggering.

As will be understood by those skilled in the art, this 10-year estimated life-cycle is based upon projections and extrapolations of systems known in the noise suppression art that use similar components. For example, a life cycle savings of approximately $275,000 to $310,000 should be experienced for re-pack maintenance of a single augmenter. In the context of a typical U.S. Government contract, assuming a time-horizon of from 25 re-packs to 75 re-packs, a savings of $7,650,000 to $22,950,000 in re-pack costs is anticipated based upon current costs. It should be appreciated that these projected cost savings are underestimated because repair cost savings associated with damaged metal components, facility shutdown costs, and/or deflector costs, are not included.

Figure 9:
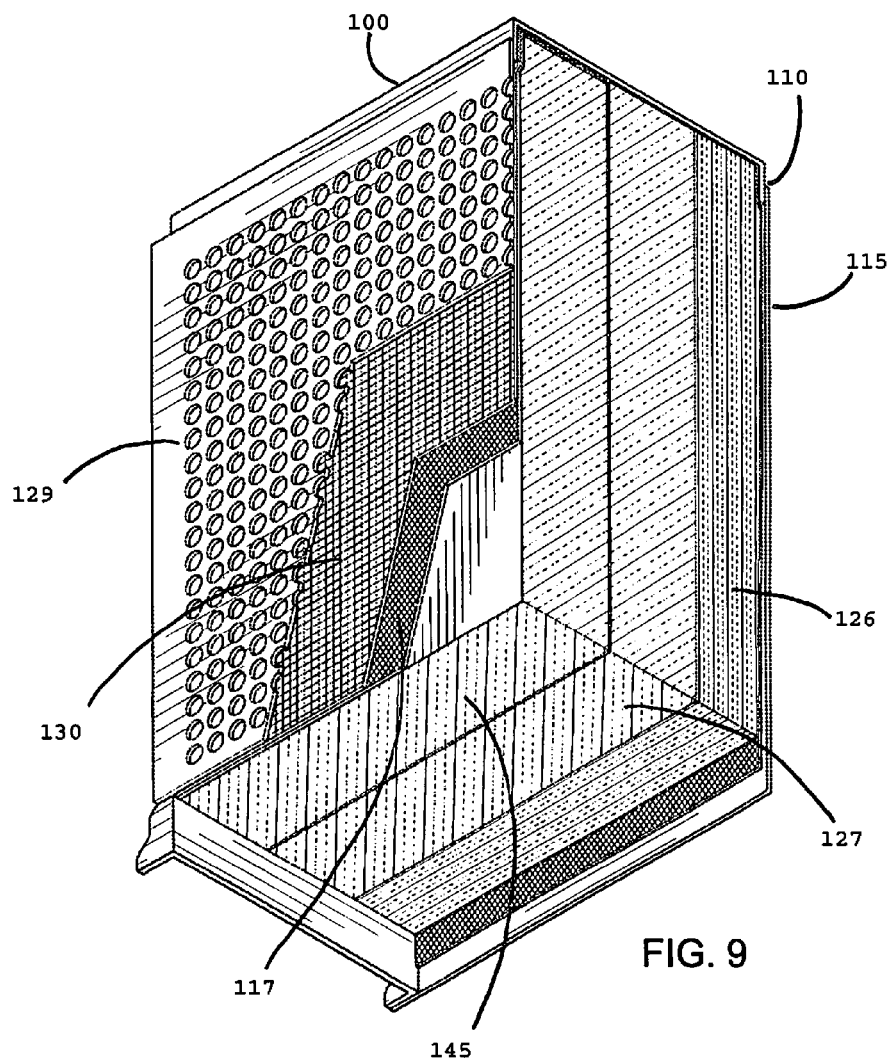
FIG. 9 depicts the embodiment of the deflector panel maintenance aspect depicted in FIG. 8, focusing on the ramp and wall sections thereof.

As will also be understood by those skilled in the art, deflector panels, depicted in FIGS. 8-9, are designed to re-direct jet engine exhaust; in so doing, these panels are directly exposed to high-temperature exiting gases. Accordingly, deflector panels are subject to even greater vibration, shock and aerodynamic forces, and temperatures than exhaust augmenters. Unfortunately, it has been a long-standing deficiency of the prior art that packing and re-packing has been limited to basalt matt 125 encased within a coarse wire mesh 130 thereby suffering from rapid insulation-loss and deflector panel performance-degradation. As known by those conversant in the art, deflector panels have frequently been observed to literally blow apart as a result of failure of frames 100 and 110, respectively, and corresponding perforated facing and back sheets 115 and 129, respectively.

The typical life cycle of deflector panel re-packing has been found to be approximately 50% of the life cycle of augmenter re-pack. Inherent in embodiments of the present invention is a structure that completely encapsulates a high-temperature acoustical pillow 145 or the like, which is preferably covered with a large-diameter, tightly-woven wire mesh 130. Similar to the Augmenter ESAK, the Deflector ESAK encapsulates and stabilizes the contained and retained insulation, prevents breakdown and loss of this crucial insulation, and uses only high-quality basalt as elucidated herein. It is estimated that, based on experience in the field, ESAK embodiments and the like will extend deflector life cycle at least three times the life cycle of conventionally-maintained deflectors.

It has been found, based upon observations in the field, that the configuration and performance of exhaust systems of commonly-used noise suppression systems contemplated hereunder suffer from a plurality of deficiencies. Such conventional sound-attenuation systems have featured augmenter and deflector designs that are typically configured to accommodate loose basalt wool insulation covered by about 4" thick basalt wool matts which are, in turn, loosely covered by 18×18 stainless steel mesh screen.

Figure 4:
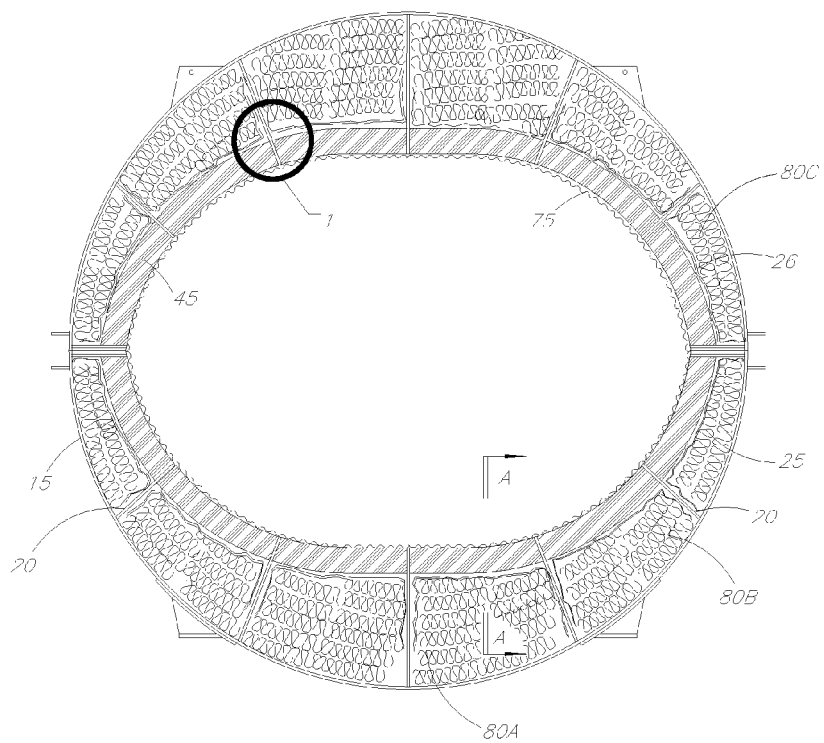
FIG. 4 depicts another embodiment of the augmenter maintenance aspect of the present invention, focusing on the conversion thereof.

Referring now to FIGS. 1 and 4, these observations demonstrate that re-packing cavities 80A, B, and C—according to U.S. Air Force drawings—results in A/F32T-9 augmenters being approximately 90% full and A/F37T-10 augmenters being approximately 85% full; interestingly, these observations have been made prior to any compaction and settling. The resulting open space in an augmenter cavity attributable to under-filling and lack of compaction allows for substantial insulation-material movement during engine testing and even during shipping. Moreover, the open space between the insulation and the liners 75 also appears to allow exhaust gases and wind velocities to engender turbulence. It has become clear that current prior art configurations fail to adequately contain and retain insulating materials. For example, it has been common practice in the art to routinely fill the bottom of a cavity with loose basalt;

this loose basalt has then been covered with a 4" woven basalt matt which has been covered by a loose wire mesh that has only been tucked around its edges. Unfortunately, this material regularly has been observed to shift during shipping and installation of the augmenter, and then shift during engine testing operations.

It should be evident that this shifting behavior of the loose insulation further complicates performance issues by causing insulating-material fibers to degrade and then be blown out of both the augmenter tubes and the deflector panels through the perforated face liner 75 during engine run-ups; ultimately, these insulating materials are caused to vibrate and blow around the inside of the cavities during engine runs.

While current augmenters per A/F37T-10 configurations and current augmenter and deflector panels per A/F32T-9 configurations are based upon designs that are about 20 and 15 years old, respectively, it is known that newer engines generate higher propulsion thrust than was originally contemplated in the early years of the U.S. Air Force Noise Suppression Program. Accordingly, it will become clear to those skilled in the art that the present invention affords an expeditious and inexpensive way to bring prerequisite maintenance up to the current engine power rating demands.

The present invention envisions loose basalt being installed to the extent of filling an implicated cavity with approximately 120 Kg/m$^3$ density basalt wool, thereby imparting 52,800 lbs of total insulation. This, of course, is significantly different from the mere 85 Kg/m$^3$ density basalt wool that presently—in prior art embodiments—imparts only 37,950 lbs of total insulation. Thus, ESAK embodiments correspond to an approximately 30% density-increase. It is contemplated that such embodiments cover basalt 25 with high-temperature acoustic grade fabric 26, such as Style 2809TS; and then is blanketed and draped over included basalt, with its edges tucked around the loose basalt; and situated to be in an abutting relationship with the augmenter shell walls 15 or the like 20. Then, preferably a high-temperature acoustic pillow is installed above the high-temperature fabric blanket; it has been found that a 6" high-temperature acoustic pillow 45 provides contemplated insulation from sound/noise.

As will be understood by those skilled in the art, an embodiment of this acoustical pillow 45 may be constructed from a layered GT basalt blanket #4005CSB that is cut to the appropriate size and weight, compressed to achieve a density of 130 kg/m$^3$ (8.1 lb/ft$^3$) and overlaid to each gas face with a 50 mm (2") layer of basalt mattress #4005SWM, which has been pre-compressed to a density of 128 kg/m$^3$ (8.1 lb/ft$^3$). This pre-compressed layer is subsequently overlaid by a 6 mm (¼ in.) layer of 434 stainless steel needlefelt #4010SGN facing material pre-cut so that it protrudes at least 50 mm (2 in.) over each side of the gas faces—with the whole assembly being subsequently covered by a wrap of lightweight lining fabric #0509, before being inserted into an outer envelope. This outer envelope preferably comprises high-temperature texturized, porous fabric #3008HT that is pre-cut and sewn to produce a depth preferably greater than about 5% of the prerequisite depth or thickness of the acoustical pillow, thereby assuring adequate contact between the pillow and the perforated metal liner 75. All seams, including the closure seam, are then preferably machine-stitched with stainless steel sewing thread #9005SS, with no seams disposed over the pillow module faces. The pillow module preferably has a net density of 130 kg/m$^3$ (8.1 lbs/ft$^3$), with a tolerance of preferably −5/+10%; a flow resistivity of 15,000 mks rayls/m; and a tolerance of preferably +/−20%. On the ends of each augmenter shell section, per FIGS. 1-2, there is situated flatbar batten plates 47 approximately 2 in. wide and ¼ in. thick×2 in. wide×3 ft–8 in. long. Then, a plain weave 40×40×0.010 wire Type 304 stainless steel mesh cloth 46 is installed and retained in situ preferably using these batten plates 48 secured with oversized washers 51 and • in. flexloc nuts 50 or the like.

As another illustration of the applicability of the present invention in the field, FIGS. 8-9 depict an embodiment for refurbishing a typical deflector ramp and wall. It will be understood by those skilled in the art that the deflector's solid back 115 would be detached and all debris contained therewithin removed. A plurality of acoustical pillows 145 having new basalt insulation would then be installed as replacement for existing loose fill basalt 125, if any were present, and corresponding plurality of steel wire screens 130 would secure the pillows; the solid back thereof would be re-attached preferably with a plurality of rivets. It will be appreciated that fiberglass cloth 117 should preferably be used to surround all seams which are preferably secured preferably with stainless steel staples. Such staples should preferably be commensurate with the other suitable stainless steel components, e.g., hereinbefore described 20×20×0.23 mm Type 304 stainless steel wire screen.

A typical wall panel acoustical pillow contemplated by the present invention comprises insulation having two layers of preferably 2 in. thick 1200° F. mineral wool 126, and one layer of 2 in. thick Owens-Corning Type TIW acoustical insulation 127 compressed to 4 in. thick. Similarly, a typical ramp acoustical panel pillow comprises insulation preferably with 2 layers of preferably 3 in. thick 1200° F. mineral wool, and one layer of 2 in. thick Owens-Corning Type TIW acoustical insulation preferably compressed to 6 in.

REPRESENTATIVE COMPONENTS INCORPORATED INTO EMBODIMENTS

An ESAK embodiment comprises the components enumerated in Table I:

TABLE I

| # | Sub-Component | Product | Sizing | Material |
|---|---|---|---|---|
| 1 | LFT GT Basalt Blanket | 4005CSB | @ required thickness | Core |
| 2 | LFT GT Basalt Mattress | 4005SWM | 50 mm 2 in. layers | Core |
| 3 | LFT 434 Grade Stainless Steel Needlefelt | 4010SGN | preferable size for the basalt blanket | Facing |
| 4 | LFT Fabric | 0509 | | Lining |
| 5 | LFT | 3008HT | | Outer Envelope |
| 6 | LFT Stainless Steel | 9002SS | | Stitching Thread |

As shown in row 1 of Table I, LFT GT exhaust splitter infill pillow is a component of the preferred embodiment. It is preferably constructed from Type LFT00-05 with the sub-component structure enumerated in rows 2-6. Thus, the core materials constitute LFT GT basalt blanket #4005CSB and LFT GT basalt mattress #4005SWM. The preferable size for the basalt blanket is an appropriate thickness and the preferable size for the basalt mattress is 50 mm 2 in. layers. The facing materials are preferably LFT 434 Grade S/Steel Needlefelt #4010SGN and are sized 6 mm @ ¼" thickness. The lining fabric materials comprise LFT Fabric #0509 and the outer envelope fabric materials comprise LFT #3008HT. The stitching thread comprises LFT S/Steel Thread # 9002SS.

Accordingly, the GT exhaust splitter infill pillows comprise layered GT basalt blanket #4005CSB cut to appropriate size and weight, compressed to achieve a density of 130 kg/m$^3$ (8.1 lb/ft$^3$), and overlaid to each gas face with a 50 mm 2 in. layer of basalt mattress #4005SWM, pre-compressed to a density of 128 g/m$^3$ (8 lb/ft$^3$). This pre-compressed layer of basalt mattress is subsequently overlaid by a 6 mm layer of 434 stainless steel Needlefelt #4010SGN facing material, cut so that it extends over each side of the gas faces by a minimum of a 50 mm 2 in. layer.

The whole assembly is then covered by a wrap of the lightweight lining fabric 0509, prior to being inserted into the outer envelope. The outer envelope comprises high-temperature, texturized, and porous fabric #3008HT, which has been pre-cut and sewn to produce a depth of +5% over the prerequisite thickness of the acoustical pillow, for assuring sufficient space between the pillow and the perforated metal sheet. All seams—including the enclosure seam—are preferably machine-stitched with stainless steel sewing thread #9002SS, with no seams situated over the gas faces of the pillow module. The finished acoustical pillow module should preferably have a net density of 130 g/m$^3$ (8.1 lb/ft$^3$), a tolerance of −5/+10%, a flow resistivity of 14,000 MKS rayls/m, and a tolerance of +/−20%.

The operational attributes may be enumerated as shown in Table II:

TABLE II

| # | Operational Attribute | Value |
|---|---|---|
| 1 | Max T Rating - Service | 700° C. (1290° F.) |
| 2 | Max Temperature Rating - Transit | 750° C. (1380° F.) |
| 3 | Max Service Velocity Rating/Temperature | 95 m/s (310 ft/s) @ 600° C. (1110° F.) |
|   |   | 85 m/s (280 ft/s) @ 625° C. (1110° F.) |
|   |   | 80 m/s (265 ft/s) @ 650° C. (1200° F.) |
|   |   | 70 m/s (215 ft/s) @ 675° C. (1200° F.) |
|   |   | 65 m/s (215 ft/s) @ 700° C. (1290° F.) |
| 4 | Velocity Profile Tolerance (% variation from mean) | +/−35% |
| 5 | Typical Airflow Resistivity | 14,000 MKS rayls/m |

Another ESAK embodiment includes LFT GT Exhaust Splitter Infill Pillow (Type LFT650-03) comprising the components enumerated in Table III:

TABLE III

| # | Sub-Component | Product | Sizing | Material |
|---|---|---|---|---|
| 1 | LFT GT Basalt Blanket | 4005CSB | @ required thickness | Core |
| 2 | LFT GT Basalt Mattress | 4005SWM | 50 mm 2 in. layers | Core |
| 3 | LFT 650 Grade E-Glass Needlemat | 4004THN (AC) | 4 mm @ 1/6 in. | Facing |
| 4 | LFT Fabric | 0509 |  | Lining |
| 5 | LFT Fabric | 3008HT |  | Outer Envelope |
| 6 | LFT Stainless Steel | 9002SS |  | Stitching Thread |

As shown in row 1, this component preferably comprises layered GT Basalt Blanket 4005CSB cut to appropriate size and weight, compressed to achieve a density of 130 kg/m$^3$ (8.1 lb/ft$^3$) and overlaid to each gas face with a 50 mm 2" layer of Basalt Mattress 4005SWM, pre-compressed to a density of 128 g/m$^3$ (8 lb/ft$^3$). This pre-compressed layer of basalt mattress is subsequently overlaid by a 4 mm layer of Thermal 650 Acoustic E-glass Needlemat 4004THN(AC) facing material, cut so that it extends over each side of the gas faces by a minimum of a 50 mm 2" layer. The whole assembly is then covered by a wrap of the lightweight lining fabric 0509, prior to being inserted into the outer envelope. The outer envelope comprises high temperature texturized porous fabric 3008HT, cut and sewn to produce a depth of +5% over the required depth (thickness) of the pillow, for assuring sufficient between the pillow and the perforated metal sheet. All seams—including the enclosure seam—are preferably machine-stitched with S/Steel Sewing Thread 9002SS, with no seams over the gas faces of the pillow module. The finished pillow module should preferably have a net density of 130 g/m (8.1 lb/ft$^3$), with a tolerance of −5/+10% and a flow resistivity of 14,000 MKS rayls/m, with a tolerance of +/−20%.

The operational attributes may be enumerated as shown in Table IV:

TABLE IV

| # | Operational Attribute | Value |
|---|---|---|
| 1 | Max Temperature Rating - Service | 650° C. (1020° F.) |
| 2 | Max Temperature Rating - Transit | 675° C. (1245° F.) |
| 3 | Max Service Velocity Rating/Temperature | 95 m/s (310 ft/s) @ 550° C. (1020° F.) |
|   |   | 85 m/s (280 ft/s) @ 575° C. (1065° F.) |
|   |   | 75 m/s (265 ft/s) @ 600° C. (1110° F.) |
|   |   | 65 m/s (230 ft/s) @ 625° C. (1110° F.) |
|   |   | 60 m/s (215 ft/s) @ 650° C. (1200° F.) |
| 4 | Velocity Profile Tolerance (% variation from mean) | +/−25% |
| 5 | Typical Airflow Resistivity | 14,000 MKS rayls/m |

The properties of ESAK embodiment having component GT Basalt Mineral Fiber Cotton Stitched Blanket—#4005CSB are enumerated in Table V:

TABLE V

| Property | Typical | Limits |
|---|---|---|
| Density, uncompressed | 60 g/m$^3$ (3.75 lb/ft$^3$) | +/− 5% |
| Mean filament diameter (airflow method) | 14 μm | 12-16 μm |
| Minimum filament diameter (microscopy) | 6 μm | >4 μm |
| Ambient flow resistivity @ 100 kg/m$^3$ (6.25 kg/ft$^3$) | 9,000 MKS Ryls/m | 8-12,000 MKS Ryls/m |
| Shrinking on heating - 4 hrs at 650° C. (1200° F.) | none detected | 0.1% max |
| Shot Content - % by wt retained on 250 μm (60 mesh/") sieve | 4% | 10% max |
| Fiber Index (Elutriator method) | 86% | 70% min |
| Commencement of Crystallization (DTA Profile) | >820° C. (1510° F.) | >815° C. (1500° F.) |

TABLE V-continued

| Property | Typical | Limits |
|---|---|---|
| Sintering Temperature | >1050° C. (1920° F.) | >1025° C. (1875° F.) |
| Commencement of Fusion | >1150° C. (2100° F.) | >1125° C. (2055° F.) |
| Resistance to oxidation (DTA Profile) | non-exothermic <820° C. (1510° F.) | non-exothermic <815° C. (1500° F.) |
| Tensile strength of cotton-stitched basalt blanket | 65 N/mm² (4TPSI) | 50 N/mm² (3TPSI) |

This shows long-strand unbonded mineral fiber blanket having excellent thermal and acoustical properties. The low oxidizable iron content, absence of mineralogical calcite, and very low shot give LFT GT basalt blanket material a high level of resistance to oxidation, attack by acidic residues, and vibration. Furthermore, this material does not accelerate corrosion of metallic components and is especially suitable for very hot dynamic silencing applications, e.g., gas turbine exhausts and associated duct-work.

Table VI enumerates thermal conductivity when this material compressed to 128 kg/m³ (8 lb/ft³)

TABLE VI

| Temperature | 93° C. (200° F.) | 149° C. (300° F.) | 260° C. (500° F.) | 93° C. (930° F.) |
|---|---|---|---|---|
| "K" Values (typical) | 0.047 | 0.057 | 0.081 | 0.171 |
| "K" Values (max) | 0.052 | 0.061 | 0.091 | 0.190 |

Acoustical absorption per impedance tube for this material compressed to 120 kg/m³ (7.5 lb/ft³) is enumerated in Table VII:

TABLE VII

| Frequency (Hz) | Absorption Coefficient Alpha Typical | Absorption Coefficient Alpha Minimum |
|---|---|---|
| 31.5 | 0.50 | 0.45 |
| 63 | 0.60 | 0.55 |
| 125 | 0.60 | 0.60 |
| 250 | 0.70 | 0.65 |
| 500 | 0.85 | 0.80 |
| 1000 | 0.95 | 0.90 |

Standard roll size is 1000 mm×50 mm×5 m length (39.4"× 2"×16") length; standard roll weight is 15 kg (33 lb)+/−5%.

Table VIII enumerates the properties of ESAK component: GTB Basalt Mineral Fiber Stainless Wired Mattress—#4005SWMS:

TABLE VIII

| Property | Typical | Limits |
|---|---|---|
| Standard density | 128 kg/m³ (8 lb/ft³) | +/−5% |
| Alternative density | 105 kg/m³ (6.5 lb/ft³) | +/− 5% |
| Mean filament diameter (as LWGM by microscopy image analysis) | 14 μm | 10-20 μm |

TABLE VIII-continued

| Property | Typical | Limits |
|---|---|---|
| Minimum filament diameter (by microscopy image analysis) | >6 μm | 6 μm |
| Ambient airflow resistivity @ 128 kg/m³ (8 kg/ft³) | 16,000 MKS Ryls/m | 15-20,000 MKS Ryls/m |
| Shrinking on heating - 4 hrs at 650° C. (1200° F.) | none detected | 0.1% max |
| Shot Content - % by wt retained on 250 μm (60 mesh/") sieve | 4% | 10% max |
| Fiber Index (Elutriator method) | 86% | 70% min |
| Commencement of Crystallization (DTA Profile) | >820° C. (1510° F.) | >815° C. (1500° F.) |
| Sintering Temperature | >1050° C. (1920° F.) | >1025° C. (1875° F.) |
| Commencement of Fusion | >1150° C. (2100° F.) | >1125° C. (2055° F.) |
| Resistance to oxidation (1st exothermic event by DTA) | 820° C. (1510° F.) | 815° C. (1500° F.) |
| Resistance to vibration (8 hrs at 4, 8, 100 Hz at 450-600° C.) | 0% volume reduction | 1% volume reduction |
| Resistance to compression (kN/m__load to yield 5% compression) | 1.35 kN/m² | +/−10% |
| Material Thickness (supplied per within stated range) | 50-100 mm | −5/+10% |
| Exfoliation/Recovery from immersion/wetting | Standard EGT test | |
| Dimensions of hexagonal mesh | 25 × 0.66 mm (1" × 0.026") | +/−5% |
| Hexagonal steel wire mesh (430 stainless steel) | 0.66 mm diameter | +/−5% |
| Steel stitching wire (430 stainless steel) | 0.27 mm diameter | +/−5% |
| Stitch pitch/density | 50 mm pitch/16 at width 1000 mm | |
| Water absorbency/repellency (with silicone treatment) | 8.9%/91.1% | +/−5% |

Table IX enumerates the thermal conductivity W/mK for this material compressed to 128 kg/m³ (8 lb/ft³:

TABLE IX

| Mean Temperature | 93° C. (200° F.) | 149° C. (300° F.) | 260° C. (500° F.) | 500° C. (930° F.) |
|---|---|---|---|---|
| "K" values (128 kg/m³ compressed to 150 kg/m³) | 0.041 | 0.049 | 0.066 | 0.155 |
| "K" values installed at 128 kg/m³ (typical) | 0.046 | 0.053 | 0.078 | 0.175 |
| "K" values installed at 128 kg/m³ (typical) | 0.048 | 0.057 | 0.083 | 0.173 |
| "K" values installed at 128 kg/m³ (typical) | 0.049 | 0.060 | 0.087 | 0.195 |
| "K" values installed at 105 kg/m³ (certified) | 0.049 | 0.061 | 0.086 | 0.198 |

Table X enumerates the acoustical absorption per impedance tube for material compressed to 128 kg/m³ (8 lb/ft³) at 380 mm (15") thickness:

TABLE X

| Frequency (Hz) | Absorption Coefficient Alpha Typical | Absorption Coefficient Alpha Minimum |
|---|---|---|
| 31.5 | 0.55 | 0.45 |
| 63 | 0.60 | 0.55 |
| 125 | 0.65 | 0.60 |
| 250 | 0.70 | 0.65 |

TABLE X-continued

| Frequency (Hz) | Absorption Coefficient Alpha Typical | Absorption Coefficient Alpha Minimum |
|---|---|---|
| 500 | 0.85 | 0.80 |
| 1000 | 0.95 | 0.90 |

Standard roll size is 1000 mm×4 m length (39.3"×13" length); nominal standard thickness is 50 mm (2") 5/+10%; standard roll weight: 50 mm/128 kg/m (8 lb/ft$^3$) is 27 kg (59.5 lb) 0/+10%; standard roll weight: 50 mm/105 kg/m$^3$ (6.5 lb/ft$^3$) is 22 kg (48.5 lb) 0/+10%.

ESAK component: LFT Stainless Steel 434 Metal Fibre Needlefelt—#4010SGN comprises long-strand fibrous stainless steel to AISI 434 specification, mechanically consolidated into a metallic felt capable of withstanding severe thermal shock and vibration. The material is resistant to corrosion, and exhibits good thermal-soak and acoustic properties; it is suitable for use in many types of very hot silencing applications including gas turbine exhausts with high gas flow rates, where the material can be used to advantage to retain and protect other unbonded fibrous materials from thermal shock and turbulence.

Table XI shows the physical characteristics of the filament diameter distribution for mean filament length of 100 mm:

TABLE XI

| Diameter | <35 μm | 35-65 μm | >65 μm |
|---|---|---|---|
| Contribution | 10% | 80% | 10% |

Table XII enumerates thermal and volumetric stability, via static test with 50 kg/m$^2$ loading per acoustical absorption per impedance tube for this material compressed to 128 kg/m (8 lb/ft$^3$) at 380 mm (15") thickness:

TABLE XII

| Packing Density | 128 kg/m$^3$ | 130 kg/m$^3$ | 140 kg/m$^3$ |
|---|---|---|---|
| Upper Stability Temperature | 815° C. | 815° C. | 815° C. |
| Packing Density Range | 120 kg/m$^3$-140 kg/m$^3$ | | |
| Max Working Temperature | 775° C. | | |
| Commencement of Sintering | 800° C. | | |

Referring now to ESAK component: LFT Acoustic E-Glass Needlemat—#4004AC, it comprises long-strand unbonded textile grade borosilicate glass fibers, mechanically consolidated to form a felt capable of withstanding severe thermal shock and vibration. It is stable in arduous environments and does not accelerate corrosion of metallic components. Confirming that it is an appropriate choice for the applications contemplated hereunder, the material has been developed to combine excellent thermal characteristics with low airflow resistivity for optimum acoustic performance when used in thin layers facing over core absorbers, making the material especially suitable for use in gas turbine exhaust silencers with high gas flow rates.

Having the filament diameter distribution enumerated in Table XIII:

TABLE XIII

| Diameter | 6 μm | 7 μm | 8 μm | 9 μm | 10 μm |
|---|---|---|---|---|---|
| Contribution | 2% | 13% | 30% | 45% | 10% | the corresponding physical characteristics for mean filament length of 50 mm (2") are enumerated in Table XIV:

TABLE XIV

| Density | 72 kg/m$^3$ (4.5 pcf) |
|---|---|
| Area Weight | 300 gsm |
| Peak Operational Temperature | 650° C. (1200° F. |
| Airflow Resistivity (ambient) | 12,000 mks Rayls/m |
| Availability Thickne | 4 mm (0.15") |

Yet another ESAK component comprises acoustic fabric with specification LFT Style #0509, plain-woven lightweight glass fabric with high air flow permeability rating, functions as inner-wrap fabric in acoustic fill modules for exhaust silencing applications up to 600° C. Similarly, it is applicable for intake silencing applications where an inner wrap is required while maintaining maximum acoustic performance. Table XV enumerates its physical characteristics:

TABLE XV

| Material | continuous filament E-glass yarn |
|---|---|
| Weave | Plain |
| Weight | 50 gsm |
| Threads/cm | 24 × 19 |
| Thickness | 0.05 mm |
| Availability Width | various |
| Permeability | 9 LFT air flow rating |

ESAK component comprising acoustic fabric with specification of LFT Style #3008HT corresponds to a medium-weight high-temperature performance fabric with very good warp/weft stability. Exceptionally high air flow permeability enables maximum acoustic absorption from materials which may be located therebehind. It is particularly useful for hot gas silencing applications operating at medium-high gas velocities up to 600° C. Table XVI enumerates its physical characteristics:

TABLE XVI

| Material | continuous filament E-glass ya |
|---|---|
| Weave | Plain |
| Weight | 50 gsm |
| Threads/cm | 24 × 19 |
| Thickness | 0.05 mm |
| Availability Width | various |
| Permeability | 9 LFT air flow rating |

ESAK component comprising acoustic fabric with associated specification of LFT Style #2809TS corresponds to a medium-weight semi-textured glass fabric with exceptionally high air flow permeability and very good warp/weft stability. It is used for hot gas silencing applications operating at medium-high gas velocities up to 625° C. and for other applications in which a very low resistivity value is required. The advantageous panoply of physical characteristics are enumerated in Table XVII:

TABLE XVII

| Material | Textured continuous filament E-glass yarn |
|---|---|
| Weave | Plain (weft texturized) |
| Weight | 280 gsm |
| Threads/cm | 8 × 5 |
| Thickness | 1.30 mm |
| Availability Width | 1150 mm |
| Permeability | 8 LFT air flow rating |

For the hereinabove illustrative materials that have been subsumed into ESAK embodiments, a reliable manufacturer and supplier therefore has been found to be Lancaster Fibre Technology Ltd., New Quay Road, Lancaster UK. Of course, other manufactures and suppliers may be selected, particularly on a component-by-component basis, but it will be appreciated that having a plurality of materials supplied by a single source simplifies the construction, installation and operation of embodiments of the present invention in contemplated environments and for contemplated applications.

ESAK embodiments have incorporated as wire cloth component, Material Alloy #304 Stainless Steel, with physical characteristics enumerated in Table XVIII:

TABLE XVIII

| Material | Alloy |
|---|---|
| Weave | Plain |
| Weight | 50 gsm |
| Strands/in. | 40 |
| Strand Size | 0.10" diameter |
| Width | 72" |
| Length | 100' |
| Open Area | 36% |

This component was obtained from Southwestern Wire Cloth Inc. of Tulsa, Okla.; as both manufacturer and supplier.

The following is a tabulation of the components depicted in the drawings:

| # | Component |
|---|---|
| 15 | Augmenter shell |
| 20 | Augmenter shell walls |
| 21 | Augmenter |
| 25 | Basalt matt |
| 26 | Acoustical blanket |
| 45 | Acoustical pillow |
| 46 | Wire mesh screen |
| 47 | Flatbar batten plates |
| 48 | Batten plates |
| 49 | Batten bars |
| 50 | Locking nuts |
| 51 | Oversized washers |
| 75 | Perforated liner sheets |
| 80A-C | Augmenter cavities |
| 85 | Bolting flange |
| 100 | Frame |
| 110 | Frame |
| 115 | Perforated sheet (facing) |
| 117 | Fiberglass cloth |
| 125 | Loose fill basalt |
| 126 | Mineral wool |
| 127 | Acoustical insulation |
| 129 | Perforated sheet (back) |
| 130 | Coarse wire mesh |
| 145 | Acoustical pillow |

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings and tables, and that the examples recited herein are intended to illustrate the underlying concepts and are not intended to constitute a limitation thereof. The present invention is to be measured by the scope of the appended claims.

What is claimed is:

1. A method for maintaining an exhaust augmenter of a jet engine noise suppressor sound attenuation system, said exhaust augmenter having an exterior shell and a cavity with interior structures, a plurality of perforated liner sheets, and a plurality of attachment fasteners, said method comprising the steps of:

dissembling said exhaust attenuator from its supporting foundation;
removing said plurality of perforated liner sheets;
repairing or replacing damaged fasteners of said plurality of attachment fasteners;
emplacing a stitched layer of basalt matt insulation at bottom portion of said exhaust augmenter cavity for providing tightly interwoven basalt fibers;
enclosing said stitched basalt layer with an acoustical blanket;
situating an acoustical pillow atop said acoustical blanket;
enclosing said acoustical pillow with mesh screen for providing an insulation retention-barrier and an acoustical pillow wear-preventive pad;
affixing said mesh screen-enclosed acoustical pillow in situ with a plurality of batten bars;
cleaning said interior structures of said augmenter cavity;
coating said cleaned interior structures with corrosion-control paint;
overfilling said coated augmenter cavity with said stitched basalt matt for providing uniform insulation density therethroughout;
securing said plurality of batten plates in situ with said plurality of retaining hardware;
re-assembling said maintained augmenter and affixing it onto said supporting foundation;
cleaning said exterior shell of said re-assembled augmenter; and
coating said cleaned exterior shell with high-temperature paint commensurate and compatible with pre-existing paint of said exhaust augmenter.

2. The method for maintaining an exhaust augmenter of a jet engine noise suppressor sound attenuation system recited in claim 1, wherein said step of enclosing said acoustical pillow comprises stainless steel wire mesh screening.

3. The method for maintaining an exhaust augmenter of a jet engine noise suppressor sound attenuation system recited in claim 1, wherein said step of affixing said mesh screen-enclosed acoustical pillow comprises welding each batten bar of said plurality of batten bars to each end of said augmenter cavity.

4. The method for maintaining an exhaust augmenter of a jet engine noise suppressor sound attenuation system recited in claim 1, wherein said step of emplacing a stitched layer of basalt matt insulation comprises cotton-stitched basalt matt.

5. The method for maintaining an exhaust augmenter of a jet engine noise suppressor sound attenuation system recited in claim 1, wherein said step of overfilling said coated augmenter cavity comprises filling with sufficient said stitched basalt matt to yield a density approximately equivalent to the density of naturally-occurring basalt for preventing settling thereof during said re-packing.

6. A maintained exhaust augmenter of a jet engine noise suppressor sound attenuation system, said maintained exhaust augmenter comprising:

a stitched layer of basalt matt insulation emplaced at bottom portion of an exhaust augmenter cavity for providing tightly interwoven basalt fibers;
an acoustical blanket enclosing said stitched basalt layer;

an acoustical pillow situated atop said acoustical blanket;

mesh screening enclosing said acoustical pillow for providing an insulation retention-barrier and an acoustical pillow wear-preventive pad;

a plurality of batten bars for affixing said mesh screen-enclosed acoustical pillow in situ;

said augmenter cavity overfilled with said stitched basalt matt for providing uniform insulation density therethroughout; and a plurality of retaining hardware for securing said plurality of batten bars in situ.

7. The maintained exhaust augmenter of a jet engine noise suppressor sound attenuation system recited in claim 6, wherein said mesh screening comprises stainless steel wire mesh screening.

8. The maintained exhaust augmenter of a jet engine noise suppressor sound attenuation system recited in claim 6, wherein said mesh screen-enclosed acoustical pillow is affixed by welding each batten bar of said plurality of batten bars to each end of said augmenter cavity.

9. The maintained exhaust augmenter of a jet engine noise suppressor sound attenuation system recited in claim 6, wherein said stitched basalt matt comprises cotton-stitched basalt matt.

10. The maintained exhaust augmenter of a jet engine noise suppressor sound attenuation system recited in claim 6, wherein said overfilled augmenter cavity comprises sufficient filling of said stitched basalt matt to yield a density approximately equivalent to the density of naturally-occurring basalt for preventing settling thereof during said basalt re-packing thereof.

11. A maintained deflector panel of a jet engine noise suppressor sound attenuation system, said maintained deflector panel comprising:

a stitched layer of basalt matt insulation emplaced at bottom portion of plurality of cavities of said deflector panel for providing tightly interwoven basalt fibers;

an acoustical blanket enclosing said stitched basalt layer;

an acoustical pillow situated atop said acoustical blanket;

mesh screen enclosing said acoustical pillow for providing an insulation retention-barrier and an acoustical pillow wear-preventive pad;

a plurality of batten bars for affixing said mesh screen-enclosed acoustical pillow in situ;

said plurality of deflector panel cavities overfilled with said stitched basalt matt for providing uniform insulation density therethroughout; and a plurality of retaining hardware for securing said plurality of batten bars in situ.

12. The maintained deflector panel of a jet engine noise suppressor sound attenuation system recited in claim 11, wherein said mesh screening comprises stainless steel wire mesh screening.

13. The maintained deflector panel of a jet engine noise suppressor sound attenuation system recited in claim 11, wherein said mesh screen-enclosed acoustical pillow is affixed by welding each batten bar of said plurality of batten bars to each end of said deflector panel cavity.

14. The maintained deflector panel of a jet engine noise suppressor sound attenuation system recited in claim 11, wherein said stitched basalt matt comprises cotton-stitched basalt matt.

15. The maintained deflector panel of a jet engine noise suppressor sound attenuation system recited in claim 11, wherein said overfilled cavity comprises sufficient filling of said stitched basalt matt to yield a density approximately equivalent to the density of naturally-occurring basalt for preventing settling thereof during said basalt re-packing thereof.

* * * * *